(No Model.) 6 Sheets—Sheet 1.

R. SOLANO.
POWER BRAKE.

No. 365,647. Patented June 28, 1887.

WITNESSES:

INVENTOR
Arnaldo Solano
BY
Chas. W. Forbes
ATTORNEY (No Model.) 6 Sheets—Sheet 2.
R. SOLANO.
POWER BRAKE.
No. 365,647. Patented June 28, 1887.
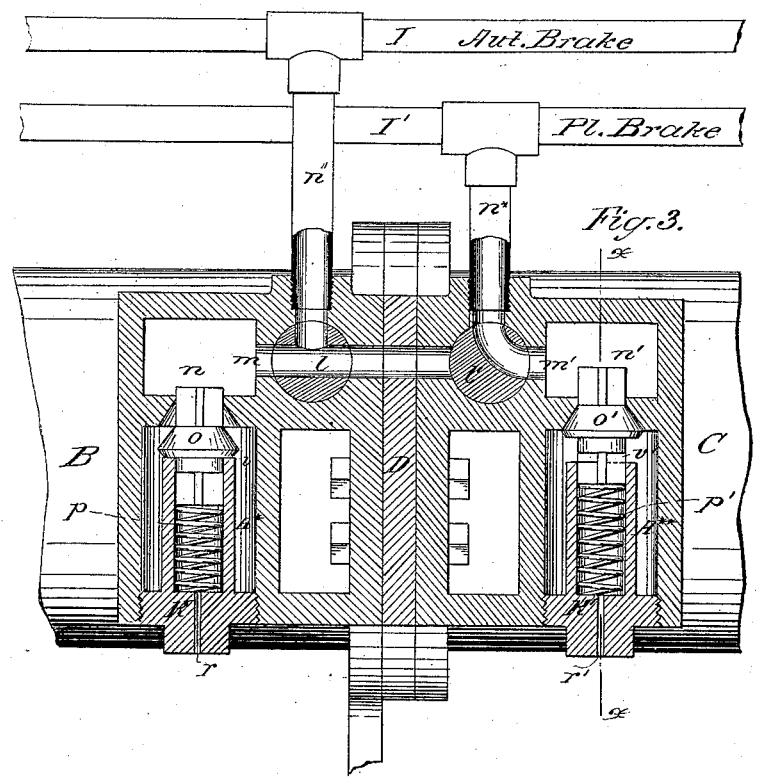
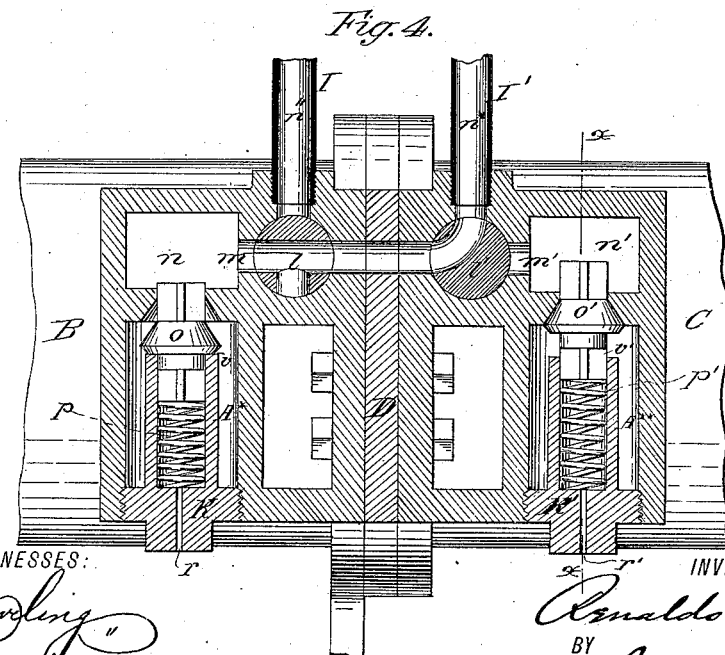

(No Model.)  6 Sheets—Sheet 3.

R. SOLANO.
POWER BRAKE.

No. 365,647.  Patented June 28, 1887.

WITNESSES

INVENTOR
Rinaldo Solano
BY
Chas. N. Forbes
ATTORNEY (No Model.)  6 Sheets—Sheet 4.
R. SOLANO.
POWER BRAKE.
No. 365,647.  Patented June 28, 1887.
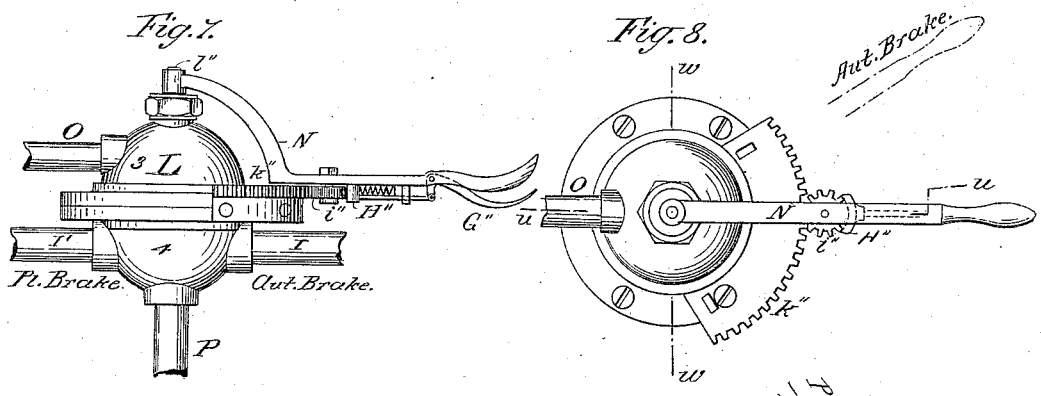
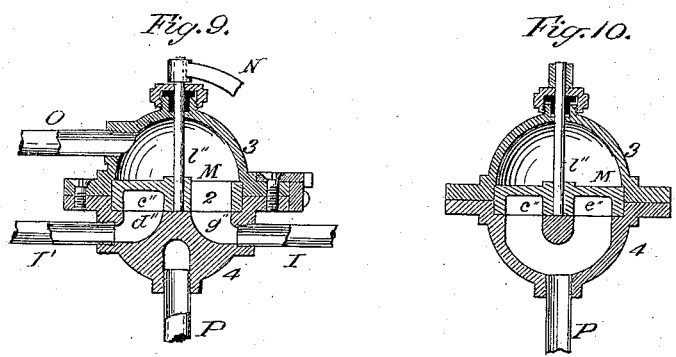
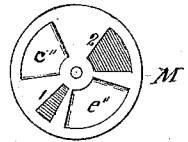
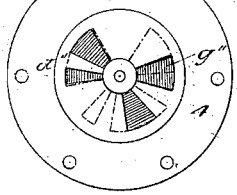
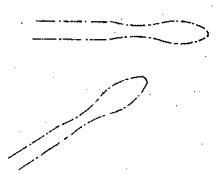
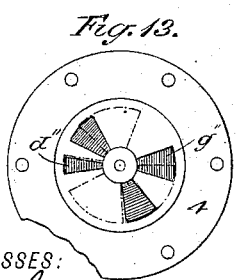
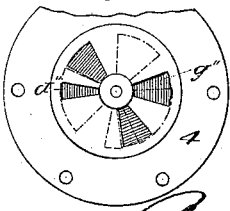
WITNESSES:
INVENTOR
Renaldo Solano
BY
Chas. H. Forbes
ATTORNEY (No Model.) 6 Sheets—Sheet 5.
R. SOLANO.
POWER BRAKE.
No. 365,647. Patented June 28, 1887.
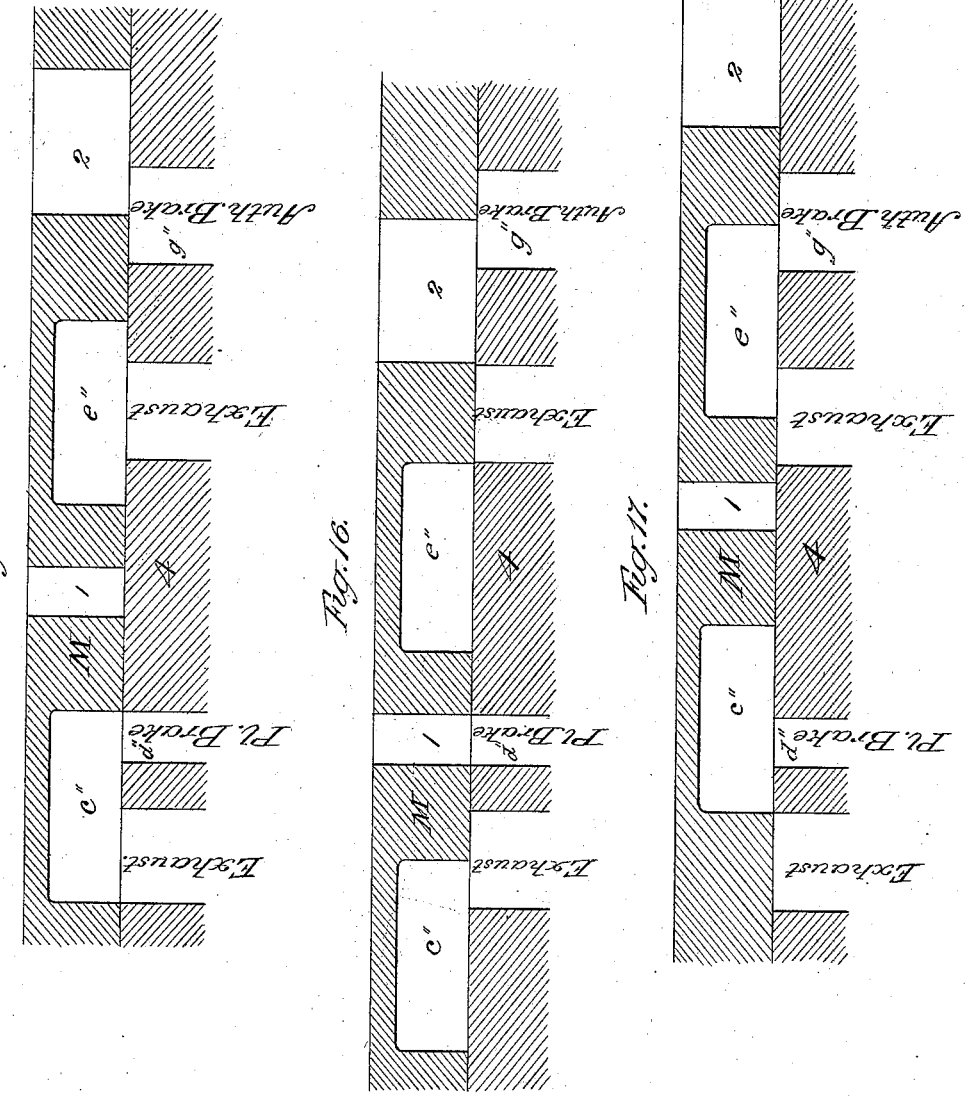
WITNESSES:
INVENTOR
Renaldo Solano
BY
Chas. H. Forbes
ATTORNEY (No Model.)  6 Sheets—Sheet 6.

R. SOLANO.
POWER BRAKE.

No. 365,647. Patented June 28, 1887.

WITNESSES:
INVENTOR
Renaldo Solano
BY
Chas. W. Corbes
ATTORNEY

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

POWER-BRAKE.

SPECIFICATION forming part of Letters Patent No. 365,647, dated June 28, 1887.

Application filed December 3, 1886. Serial No. 220,566. (No model.)

*To all whom it may concern:*

Be it known that I, RENALDO SOLANO, a citizen of the United States, residing at Brooklyn, in the county of Kings, State of New York, have invented a new and useful Improvement in Power-Brakes, of which the following is a specification, reference being had to the accompanying drawings, forming a part of the same, in which—

Figure 1:
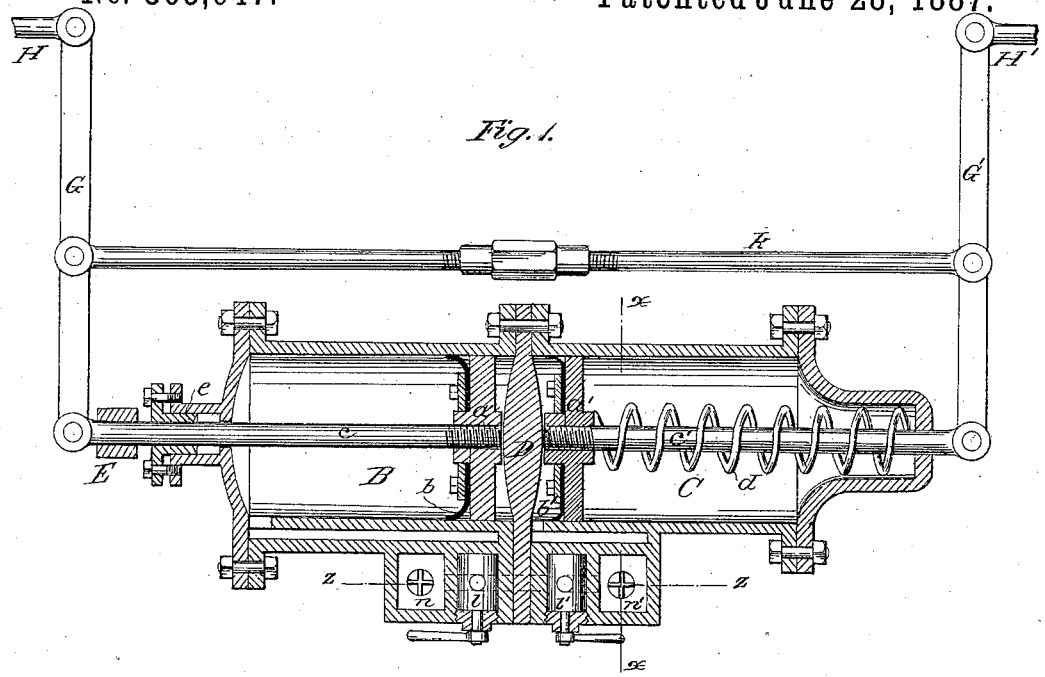
Figure 2:
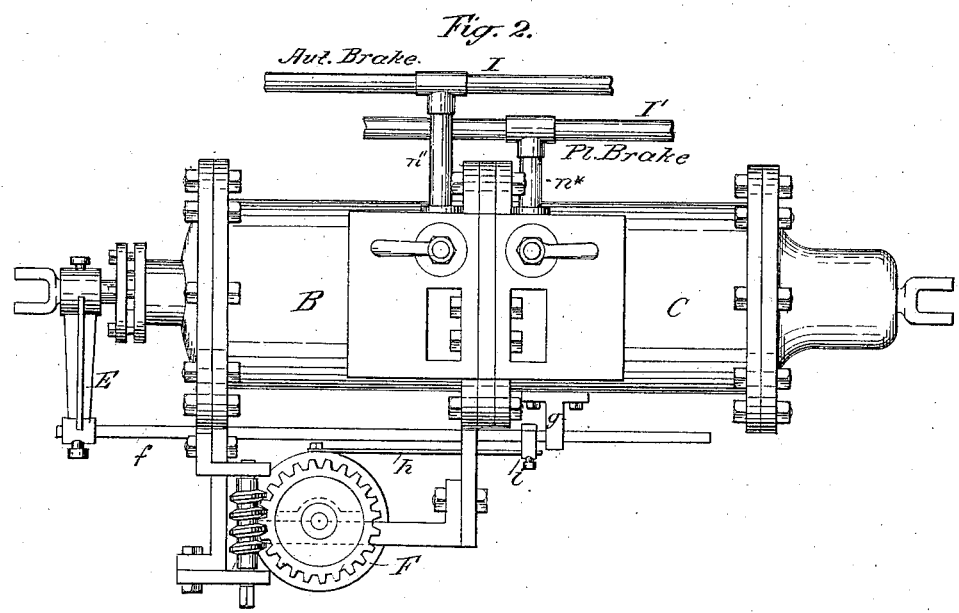
Figure 5:
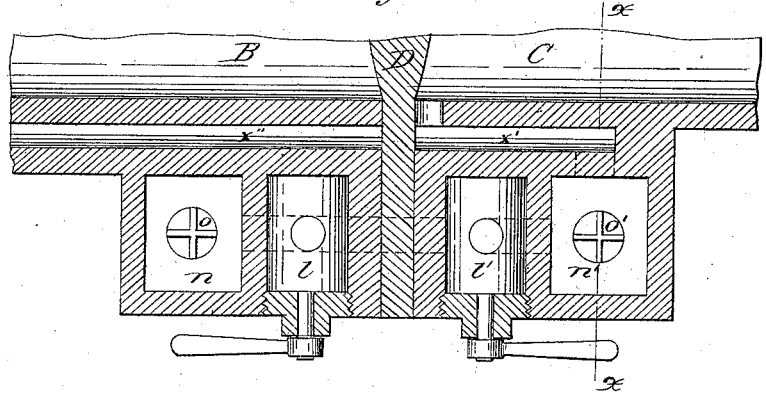
Figure 6:
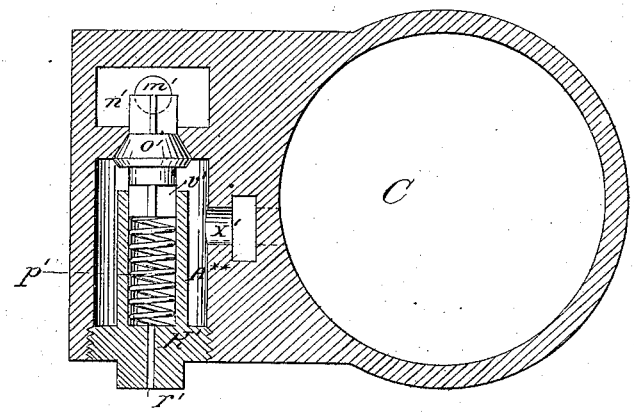
Figure 18:
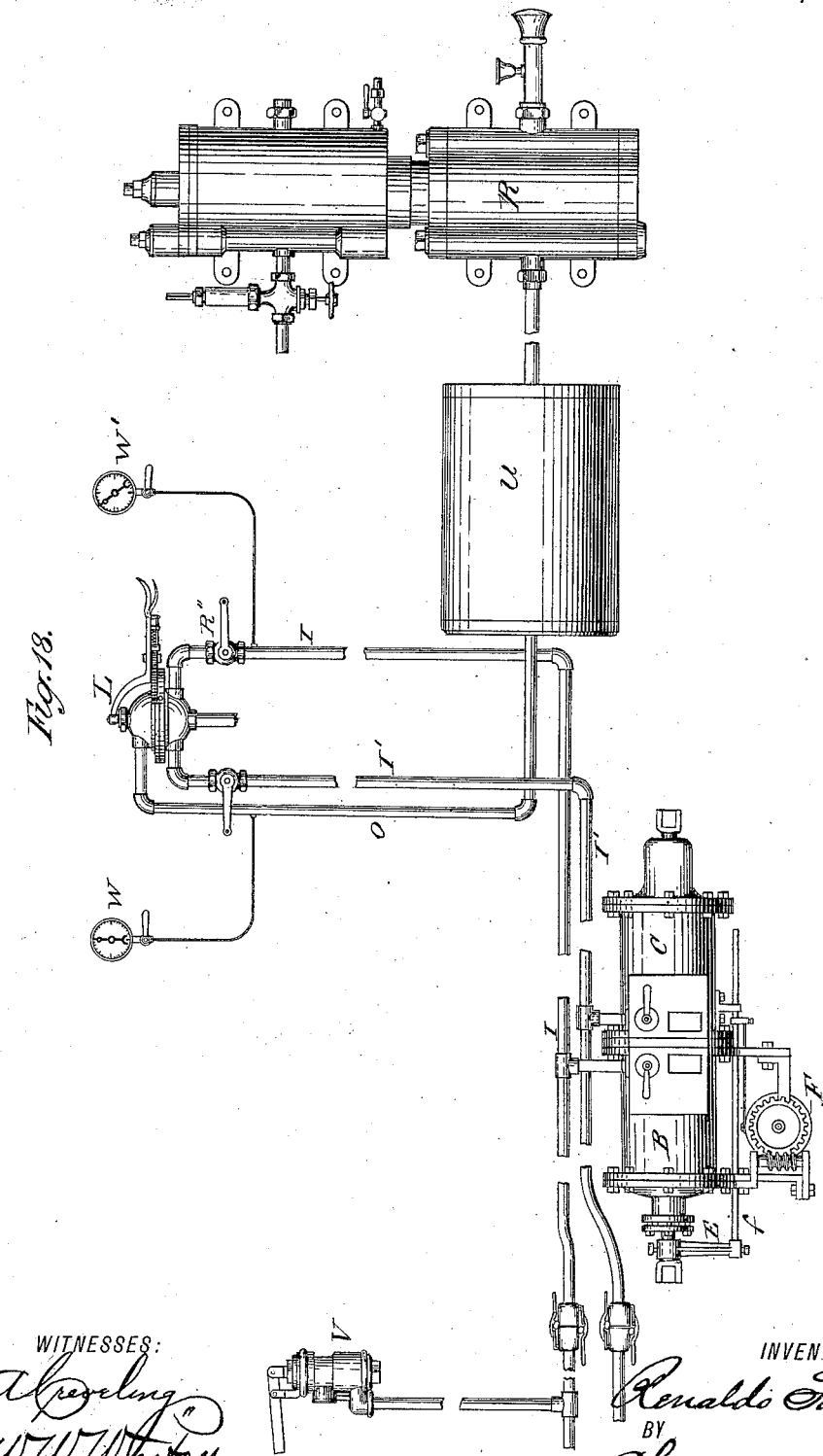

Figure 1 is a longitudinal sectional view showing the position of the operative parts when the brakes are free. Fig. 2 is a plan view showing the relative position of the reserved mechanical power. Fig. 3 is a vertical longitudinal sectional view taken on the line $z\,z$ of Fig. 1; and Fig. 4, a similar view indicating, respectively, the position of the parts when the connecting-pipes are in condition for use and when the automatic pipe has been ruptured and the automatic apparatus applied through the straight air-pipe. Fig. 5 is an enlarged sectional view of the cock and air-chambers as shown in Fig. 1. Fig. 6 is a cross-sectional view taken on the line $x\,x$, Figs. 1, 3, 4, and 5. Fig. 7 is a side view of the operating-valve; Fig. 8, a plan view; Fig. 9, a vertical cross-sectional view taken in line $u\,u$, Fig. 8; Fig. 10, a vertical cross-sectional view taken in line $w\,w$, Fig. 8; Fig. 11, an inverted plan view of the valve-disk, and Figs. 12, 13, and 14 views showing the different positions of the valve when in use. Figs. 15, 16, and 17 are linear views of the positions of the valve shown in Figs. 12, 13, 14. Fig. 18 is a general plan view of the whole apparatus.

Similar letters of reference indicate corresponding parts in the several figures.

The object of my invention is to combine in one apparatus devices for operating the brake independently and directly at the will of the engineer, for operating the brake automatically in the event of accident, and for utilizing and applying the mechanical reserved power when required to assist the automatic action, thus dispensing with the auxiliary reservoir commonly used in automatic air-brakes, and also for applying the full power of the air-pressure in conjunction with the mechanical reserved force, thereby insuring a quicker stop than is possible with the air-pressure alone.

In order that others may understand and use my invention, I will first proceed to describe an apparatus embodying it, and subsequently to point out in the claims its novel characteristics.

In the drawings, B and C represent a pair of cylinders arranged adjacent to each other and separated by the interposed plate D. In said cylinders are placed the pistons $a\,a'$, provided with suitable packing, $b\,b'$, and having connected piston-rods $c\,c'$, one of said rods having a spiral spring, $d$, arranged, as shown, to keep it in its normal position when unemployed. The cylinder B is fitted with a stuffing-box, $e$, with suitable packing, through which the piston-rod $c$ moves.

E is an arm that projects from and is fastened to the piston-rod $c$ in any suitable manner, and to which is fastened the rod $f$, which passes through and is supported by a T-bracket, $g$, which is secured to the side of the cylinder C.

F represents a mechanical reserved power, which may consist of a spring-cylinder set by worm-gearing that may be operated by a crank or otherwise, said gearing being connected to the rod $f$ by a chain or wire cable, $h$, and the fastening $i$.

G G' are levers connected to the respective piston-rods $c\,c'$ and connected together by an adjustable connecting-rod, $k$, at any point that practice may suggest, the outer ends of the levers G G' being connected to the brake-rods H H'.

I is the automatic air-pipe, communicating with the operating-valve on the engine and the cylinder B through a three-way cock, $l$, and inlet $m$ to chamber $n$.

I' is the main air-pipe, communicating with the operating-valve on the engine and with the cylinder C through the two-way cock $l'$ and inlet $m'$ to chamber $n'$.

K K' are two bushings screwed into the casings of the cylinders B and C, which support the valves $o\,o'$ and retain the spiral springs $p\,p'$. These bushings have outlets $r\,r'$ to the atmosphere, and also form an annular chamber A A, which has a port or passage, $x'$ $x$, leading to the cylinders B and C.

L represents the operating-valve that is under the control of the engineer. (Shown in Figs. 7, 8, 9, 10, 11, 12, 13, and 14; also in variable positions in linear Figs. 15, 16, and 17.) This valve is arranged between the parts 3 and 4 and constructed on the principle of the ordinary D-valve, having two hollow chambers, $c''e''$, provided with two ports, 1 2, in the valve-disk M. The valve is turned by means of the projecting lever N to register with the respective pipe-connections I I' O P, to operate the apparatus as desired.

O is the pipe that leads from the main reservoir to the valve.

P is the pipe that leads from the valve to the atmosphere.

U is an air-reservoir placed on the locomotive, and R the air-compressor.

V is a conductor's relief-valve, placed on the several cars, so that the automatic apparatus can be operated, if desired, from the respective cars.

W W' are gages to indicate the air-pressure in the respective pipes.

Having now referred to the several parts composing my apparatus, the following description of its operation will readily explain their purpose. To apply the brake directly, the engineer moves the lever N toward the dotted lines marked "pl. brake" by pressing the small lever G'' and disengaging the spring-detent H'' upon the small cog-wheel $i''$, thus allowing the lever N to move and turn the cog-wheel $i''$ on the segment $k''$ and the spindle $l''$, that is fastened to the valve-disk M, which moves the valve to the position shown in Figs. 8 and 13 and linear view, Fig. 16. This allows the compressed air in the reservoir U, pipe O, and valve-chamber 3, to pass through the port $l$ in valve-disk M and port $d''$ in part 4 to the pipe I', that leads to the cylinder C, thence through the small pipe-connection $n'$ to the two-way cock $l'$ and to chamber $n'$, moving the spring $p'$, and also the relief-valve $o'$, from its seat, thereby closing the opening $v'$ between the casing K' and the valve $o'$. The chamber A is charged, and the air flowing through the passage-inlet $x'$ into the cylinder C pushes the piston $a'$, piston-rod $c'$, and lever G'. The lever G has its fulcrum at the end of the piston $c$ through the connecting-rod $k$ and draws the brake-rods H H' until the brakes are set. To release the brakes, the valve M is turned to the position shown in Figs. 8, 12 and linear view, Fig. 15, which allows the pressure to escape from the pipe I' through the port $d''$ and exhaust-chamber $c''$ in the valve M, and through the pipe P to the atmosphere, the back-pressure in the cylinder C closing the valve $o'$, and the air escapes through the openings $v'$ and $r'$, as shown in Figure 3.

To set and charge the apparatus so that it will operate automatically in the event of accident, the operating-valve M is made so that it will keep the automatic pipe through the train charged, excepting when a three-way cock, R'', placed on the pipe near the operating-valve, is turned to cut off communication, as hereinafter explained. The air being under compression in the main reservoir on the engine, it flows through the pipe O to the air-chamber 3 above the valve M, and through the port 2 into port $g''$, pipe I, and small pipe $n''$, then through the three-way cock $l$ into the chamber $n$, pressing the spring relief-valve $o$ from its seat and closing the opening V between the casing K and the valve, thus charging the chamber A and allowing the air to pass through the passage or inlet $x''$ into the cylinder B, pushing piston $a$, piston-rod $c$, and lever G, and also the arm E, that supports the rod $f$, to which is connected the mechanical reserved power referred to. The mechanical power is thereby set and kept on a tension to operate the brakes upon the release of the air-pressure or upon a rupture of the pipe.

If it be desired to utilize the mechanical reserve force to set the brakes, the operating-valve M is turned to the position shown in Figs. 8 and 14 and linear view Fig. 17, which will allow the air to escape from the pipe I through the hollow recess $e''$ of the disk M to the pipe P, and thus to the atmosphere. In case of a rupture of the pipe the engineer is able to detect the automatic action by the strain on the locomotive and the sudden reduction of the indicated pressure on the pressure-gage W'. Consequently, there being no pressure in the air-chamber $n$, the back-pressure in the cylinder B closes the valve $o$, which allows the air to escape through the openings $v$ and $r$ to the atmosphere. The mechanical reserved force F draws on the chain $h$, rod $f$, and arm E, connected to the piston $c$, thus pushing out the lever G and causing the lever G' to fulcrum at the end of the piston-rod C' and operate through the connecting-rod K, which draws upon the brake-rods H H' until the brakes are set. In case of an accident to the automatic pipe the mechanical reserved force can be operated from the direct air-pipe I' by turning the cocks $l\ l'$, as shown in Fig. 4. In the event of imminent danger that requires the engineer to stop the train as soon as possible, the direct air-pressure is applied, and by allowing the air to escape from the pipe I by turning the three-way cock R'' the mechanical reserved force is utilized in conjunction with the direct air-pressure.

In the use of my invention the several applications of power are instantly effected by a simple and definite movement of a lever requiring no such alteration, adjustment, or manipulation of cocks or valves common to devices of this character. In an emergency the whole power is instantly applied to stop the train in the shortest possible time, and in the use of the direct-acting devices perfect control of the train is maintained by the application of little or much power, as desired.

Having thus fully described an apparatus embodying my invention, what I claim, and desire to secure by Letters Patent, is—

In a power-brake, a duplex cylinder provided with two pistons connected to vibrating power arms or levers coupled by an interposed rod, in combination with a connected mechanical-power device, one part or chamber of said cylinder being charged with pressure, which holds the connected mechanical power under tension, whereby in the event of rupture of the pressure-pipe, or when said pressure is relieved by the engineer, said mechanical power acts to apply the brakes, as explained.

RENALDO SOLANO.

Witnesses:
CHAS. W. FORBES,
A. CREVELING.